United States Patent [19]

Konno et al.

[11] Patent Number: 5,397,048
[45] Date of Patent: Mar. 14, 1995

[54] NEEDLE FOR APPLYING VISCOUS FLUID

[75] Inventors: Masahiko Konno; Yasuhisa Miyata, both of Saitama, Japan

[73] Assignee: Pioneer Electronic Corporation, Tokyo, Japan

[21] Appl. No.: 120,910

[22] Filed: Sep. 15, 1993

[30] Foreign Application Priority Data

Sep. 22, 1992 [JP] Japan .................. 4-072192 U

[51] Int. Cl.[6] ............................................ B23K 3/06
[52] U.S. Cl. .......................................................... 228/33
[58] Field of Search ............................ 228/33; 604/190

[56] References Cited

U.S. PATENT DOCUMENTS 3,757,779  9/1973  Rovinski .................. 604/190
4,061,143 12/1977  Ishikawa ................. 604/190

Primary Examiner—Kenneth J. Ramsey
Attorney, Agent, or Firm—Nikaido Marmelstein Murray & Oram

[57] ABSTRACT

A needle has an inner passage for applying viscous fluid. A filter having a plurality of minute perforations is provided in the needle, whereby the fluid enters the inner passage through the filter.

1 Claim, 1 Drawing Sheet

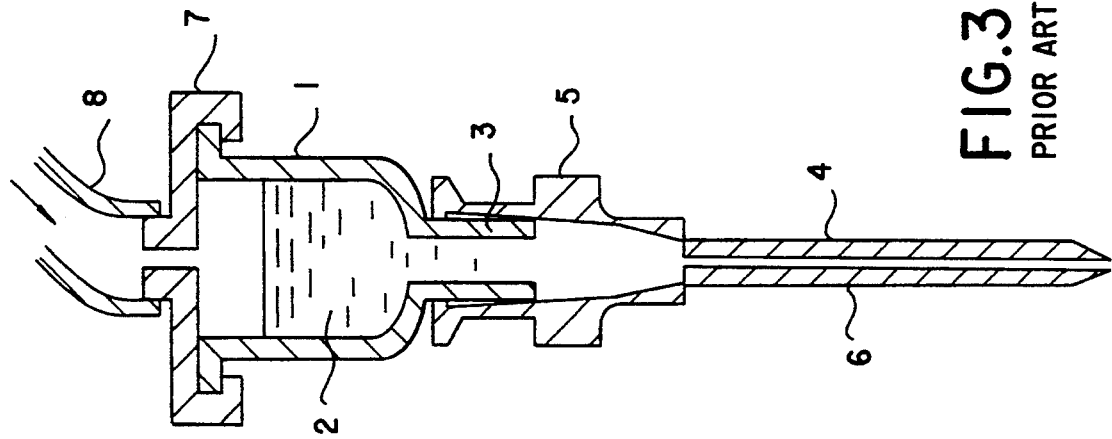
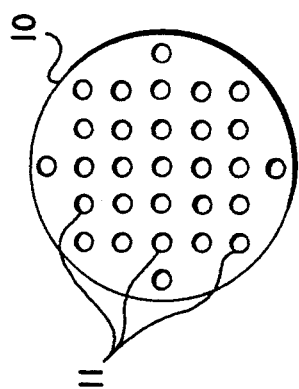
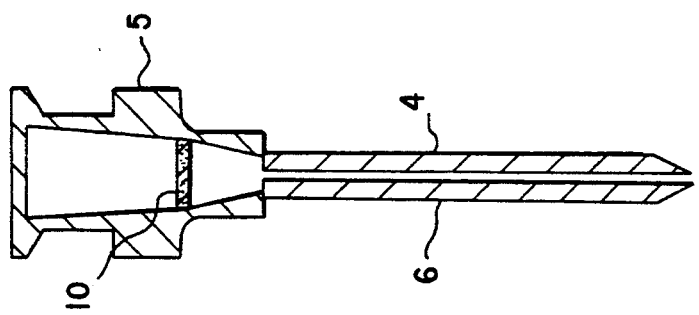

NEEDLE FOR APPLYING VISCOUS FLUID

BACKGROUND OF THE INVENTION

The present invention relates to a needle for applying viscous fluid such as cream-like solder, and more particularly to a needle which is not clogged with the solder.

In an electronic device, terminals of electronic elements are soldered on a wiring pattern formed on a substrate of a semiconductor chip. Increase in the functions of the device has rendered the terminals to be densely mounted, which requires high accuracy of the soldering operation.

Referring to FIG. 3, a conventional dispenser for applying solder has a syringe 1 in which cream-like solder 2 is charged. The syringe 1 is covered with an air-tight cap 7 having an upper opening. A pressure pipe 8 is attached to the cap 7 for supplying air into the syringe 1 through the opening of the cap.

On the bottom of the syringe 1 is formed a projection 3 having a hole, which engages with a holder 5 of a needle 4. The needle 4 has an axial passage 6 having a diameter about 0.26 mm.

When air pressure is applied to the syringe 1 through the pipe 8, the solder 2 flows downwardly through the holder 5 and the needle 4, and is discharged out from the needle 4. Since the diameter of the passage 6 is small, a strip of solder having an appropriate width is formed.

However, the solder 2 is not always constantly discharged from the needle 4. Moreover, the passage 6 may be clogged with the solder 2. These inconveniences occur under the following circumstances:

(1) The solder 2 contains solids caused by ingredients, such as flux, which are larger than the diameter of the passage 6.
(2) The solder 2 is not homogeneous in viscosity.
(3) The solder 2 is thixotropic so that when the flow rate varies, the viscosity becomes high.

SUMMARY OF THE INVENTION

An object of the present invention is to provide a needle through which the viscous fluid can be evenly discharged.

According to the present invention there is provided a needle having an inner passage for applying viscous fluid, wherein a filter having a plurality of minute perforations is provided in an enlarged hollow space upstream from the inner passage of the needle, so that the fluid enters the inner passage through the filter.

Hence, solids contained in the fluid is prevented from entering the passage in the needle. The fluid is agitated as it passes through the filter, and downstream into the inner passage, thereby rendering the viscosity of the fluid even. In the case of a thixotropic fluid, the filter causes the slip rate of the fluid, to be constant, so that the viscosity of the fluid becomes even.

The other objects and features of this invention will become understood from the following description with reference to the accompanying drawings.

BRIEF DESCRIPTION OF DRAWINGS

FIG. 1 is a sectional view of a needle according to the present invention for applying viscous fluid;
FIG. 2 is a plan view of a filter provided in a holder of the needle of FIG. 1; and
FIG. 3 is a sectional view of a conventional dispenser for applying viscous fluid.

DETAILED DESCRIPTION OF THE PREFERRED EMBODIMENT

An embodiment of the present invention is described hereinafter with reference to FIGS. 1 and 2. The same references in FIG. 3 designate the same parts in the figures.

Referring to FIG. 1, the needle 4 according to the present invention is adapted to be attached to the syringe 1 of FIG. 3 through the holder 5. A planar porous filter 10 is provided in the hollow space of the holder 5, attached to the inner wall thereof. As shown in FIG. 2, the filter has a plurality of minute perforations 11. Each perforation 11 has a diameter smaller than solid included in the solder 2.

When discharging the solder 2 from the needle 4 in the same manner as in the conventional dispenser, solids of flux which are larger than the perforation 11 contained in the solder 2 remains in the holder 5 without passing through the perforations 11 of the filter. The rest of the solder 2 is agitated while passing through the filter 10 and downstream into the inner passage, 6, of the needle so that the solder 2 is thoroughly mixed. As a result, the viscosity of the solder becomes even. Even if a thixtropic solder is used, since the slip rate at which the solder 2 flows through the filter 10 is constant, the viscosity thereof becomes also constant.

From the foregoing it will be understood that the present invention provides a needle for applying viscous fluid wherein a filter is provided upstream of the needle to prevent solids contained in the fluid from entering the needle. Thus the needle is prevented from clogging. The fluid is sufficiently agitated when passing through the filter so that the viscosity of the fluid becomes even. In the case of a thixotropic fluid, the slipping rate of the fluid as it passes through the filter is constant so that the viscosity thereof becomes also constant.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A needle device comprising a holder having a hollow space therein, a needle having an inner passage for applying viscous fluid attached to said holder and communicating with said hollow space, and a filter having a plurality of minute perforations provided in the needle holder upstream of the inner passage so that the fluid enters the inner passage through the filter, each of the perforations of the filter, having a diameter smaller than a solid included in the fluid, said hollow space having a larger cross sectional area than said inner passage, an agitating space being defined in said hollow space downstream of said filter and upstream of said inner passage.

* * * * *